United States Patent
Frankovich (10) Patent No.: US 10,393,365 B2
(45) Date of Patent: Aug. 27, 2019

(54) WHEELCHAIR LIGHTING SYSTEMS AND METHODS

(71) Applicant: Revolights, Inc., Emeryville, CA (US)

(72) Inventor: John Kent Frankovich, San Francisco, CA (US)

(73) Assignee: Revolights, Inc., Emeryville, CA (US)

(*) Notice: Subject to any disclaimer, the term of this patent is extended or adjusted under 35 U.S.C. 154(b) by 0 days.

(21) Appl. No.: 15/946,661

(22) Filed: Apr. 5, 2018

(65) Prior Publication Data

US 2018/0292082 A1    Oct. 11, 2018

Related U.S. Application Data

(60) Provisional application No. 62/481,906, filed on Apr. 5, 2017.

(51) Int. Cl.
*H05B 33/08* (2006.01)
*F21V 33/00* (2006.01)
*F21S 9/02* (2006.01)
*A61G 5/10* (2006.01)
*B60Q 1/00* (2006.01)
*A61G 5/02* (2006.01)
*F21Y 115/10* (2016.01)

(52) U.S. Cl.
CPC ............ *F21V 33/0068* (2013.01); *A61G 5/02* (2013.01); *A61G 5/10* (2013.01); *A61G 5/1054* (2016.11); *B60Q 1/00* (2013.01); *F21S 9/02* (2013.01); *H05B 33/0845* (2013.01); *A61G 2203/10* (2013.01); *A61G 2203/16* (2013.01); *A61G 2203/36* (2013.01); *F21Y 2115/10* (2016.08)

(58) Field of Classification Search
CPC ... F21V 33/0068; A61G 5/10; A61G 2203/10; A61G 2203/36; F21S 9/02; H05B 33/0845; F21Y 2115/10
USPC .... 315/77–82, 151, 185 R, 209 R, 291, 294, 315/307, 308, 312
See application file for complete search history.

(56) References Cited

U.S. PATENT DOCUMENTS

| | | | |
|---|---|---|---|
| 2,788,763 | A | 4/1957 | Ries |
| 3,764,976 | A | 10/1973 | Mac Mahon |
| 3,897,409 | A | 7/1975 | Fritz et al. |
| 3,972,302 | A | 8/1976 | Sherman |
| 3,982,771 | A | 9/1976 | Tropeano |
| 3,987,409 | A | 10/1976 | Freeman |
| 4,049,959 | A | 9/1977 | Ledterman |

(Continued)

FOREIGN PATENT DOCUMENTS

| | | |
|---|---|---|
| GB | 2345529 | 7/2000 |
| GB | 2382211 | 5/2003 |

(Continued)

OTHER PUBLICATIONS

MonkeyLectric "Mini Monkey Light—8-Bit Bike Light" kickstarter.com.

*Primary Examiner* — Jimmy T Vu (74) *Attorney, Agent, or Firm* — Jeffrey Schox; Diana Lin (57) ABSTRACT

Systems and methods for providing adequate lighting and illumination for a wheelchair are disclosed. A lighting apparatus that is configured to be integrated with a wheelchair pushrim is also disclosed. The light emitting elements are configured to project light forward and to the rear, as well as to the side of the wheel. Methods of controlling light emitting elements are also disclosed.

18 Claims, 11 Drawing Sheets

(56) References Cited

U.S. PATENT DOCUMENTS

| | | | |
|---|---|---|---|
| 4,088,882 A | 5/1978 | Lewis | |
| 4,135,229 A | 1/1979 | Modurkay | |
| 4,204,191 A | 5/1980 | Daniels | |
| 4,225,848 A | 9/1980 | Roberts | |
| 4,321,883 A | 3/1982 | Ruppa | |
| 4,483,586 A | 11/1984 | Sisto | |
| 4,575,189 A | 3/1986 | Johnson | |
| 4,586,454 A | 5/1986 | Hedquist et al. | |
| 4,763,230 A | 8/1988 | Cummings et al. | |
| 4,787,014 A | 11/1988 | Wodder et al. | |
| 4,860,177 A | 8/1989 | Simms | |
| 4,875,142 A | 10/1989 | Spector | |
| 5,121,305 A | 6/1992 | Deed et al. | |
| 5,283,547 A | 2/1994 | Leon | |
| 5,584,562 A | 12/1996 | Geran | |
| 5,652,677 A | 7/1997 | Burison | |
| 5,800,039 A | 9/1998 | Lee | |
| 5,857,762 A | 1/1999 | Schwaller | |
| 5,874,792 A | 2/1999 | Chen et al. | |
| 5,903,224 A | 5/1999 | Reynolds | |
| 6,072,386 A | 6/2000 | Yu | |
| 6,126,243 A | 10/2000 | Okajima et al. | |
| 6,170,968 B1 | 1/2001 | Caswell | |
| 6,227,688 B1 | 5/2001 | Taylor et al. | |
| 6,241,371 B1 | 6/2001 | Dai | |
| 6,247,548 B1 | 6/2001 | Hayashi et al. | |
| 6,265,984 B1 | 7/2001 | Molinaroli | |
| 6,286,982 B1 | 9/2001 | Tashiro | |
| 6,359,551 B1 | 3/2002 | Suda | |
| 6,492,963 B1 | 12/2002 | Hoch | |
| 6,501,199 B2 | 12/2002 | Hung | |
| 6,565,242 B2 | 5/2003 | Dai | |
| 6,598,894 B1 | 7/2003 | Fujii et al. | |
| 6,789,928 B2 | 9/2004 | Khan | |
| 6,805,473 B2 | 10/2004 | Beard | |
| 6,822,357 B2 | 11/2004 | Hung | |
| 6,824,284 B2 | 11/2004 | Chinniah et al. | |
| 6,832,847 B2 | 12/2004 | Forsythe et al. | |
| 6,966,569 B2 * | 11/2005 | Miyoshi | A61G 5/02 280/250.1 |
| 6,988,818 B2 | 1/2006 | Tristram | |
| 7,021,800 B2 | 4/2006 | Roberts | |
| 7,046,131 B2 | 5/2006 | Todorox | |
| 7,048,421 B1 | 5/2006 | Allen-Atkins | |
| 7,063,391 B2 | 6/2006 | Peng | |
| 7,096,046 B2 | 8/2006 | Shapiro et al. | |
| 7,417,555 B2 | 8/2008 | Chivarov et al. | |
| 7,438,454 B2 | 10/2008 | Chinniah et al. | |
| 7,477,208 B2 | 1/2009 | Matlock et al. | |
| 7,488,100 B2 | 2/2009 | Roberts | |
| 7,621,549 B2 | 11/2009 | Van Houweling | |
| 7,722,231 B2 | 5/2010 | Carillo | |
| 8,131,413 B2 | 3/2012 | Yuan | |
| 8,223,003 B2 | 7/2012 | Chang et al. | |
| 8,337,060 B1 | 12/2012 | Frankovich | |
| 8,648,515 B2 | 2/2014 | Lau et al. | |
| 8,851,719 B2 * | 10/2014 | Frankovich | B60Q 1/326 315/76 |
| 2002/0163817 A1 | 11/2002 | Bukowsky | |
| 2006/0092647 A1 | 5/2006 | Glasser | |
| 2006/0158890 A1 | 7/2006 | Freedman | |
| 2007/0014119 A1 | 1/2007 | Burkett | |
| 2007/0035956 A1 | 2/2007 | Topps | |
| 2007/0063831 A1 | 3/2007 | Perkins et al. | |
| 2007/0171664 A1 | 7/2007 | Shih et al. | |
| 2008/0136660 A1 | 6/2008 | Bailey | |
| 2008/0219014 A1 | 9/2008 | Loibl | |

FOREIGN PATENT DOCUMENTS

| | | |
|---|---|---|
| GB | 2409440 | 6/2005 |
| WO | 033700 | 5/2001 |
| WO | 071198 | 6/2008 |

* cited by examiner

WHEELCHAIR LIGHTING SYSTEMS AND METHODS

CROSS-REFERENCE TO RELATED APPLICATIONS

This application claims the benefit of U.S. Provisional Application No. 62/481,906 filed 5 Apr. 2017, which is incorporated in its entirety by this reference.

This application is related to U.S. application Ser. No. 15/611,207 filed 1 Jun. 2017, which is a continuation of U.S. application Ser. No. 15/354,559, filed 17 Nov. 2016, which is a continuation of U.S. application Ser. No. 15/041,904, filed 11 Feb. 2016, which is a continuation-in-part of U.S. application Ser. No. 14/506,986 filed 6 Oct. 2014, which is a continuation of U.S. application Ser. No. 13/972,563 filed 21 Aug. 2013, which is a continuation of U.S. application Ser. No. 13/718,751 filed 18 Dec. 2012, which is a continuation of U.S. application Ser. No. 13/342,894 filed 3 Jan. 2012, which claimed priority to U.S. Provisional Application No. 61/559,055 filed 12 Nov. 2011 and U.S. Provisional Application No. 61/508,184 filed 15 Jul. 2011; and is a continuation of U.S. application Ser. No. 15/354,559, filed 17 Nov. 2016, which is a continuation of U.S. application Ser. No. 15/041,904, filed 11 Feb. 2016, which claims the benefit of U.S. Provisional Application No. 62/115,005, filed 11 Feb. 2015, all of which are incorporated in their entireties by this reference.

TECHNICAL FIELD

This invention relates generally to the lighting systems field, and more specifically to a new and useful lighting control system in the lighting system field.

DESCRIPTION OF THE PREFERRED EMBODIMENTS

The following description of the preferred embodiments of the invention is not intended to limit the invention to these preferred embodiments, but rather to enable any person skilled in the art to make and use this invention.

Figure 1:
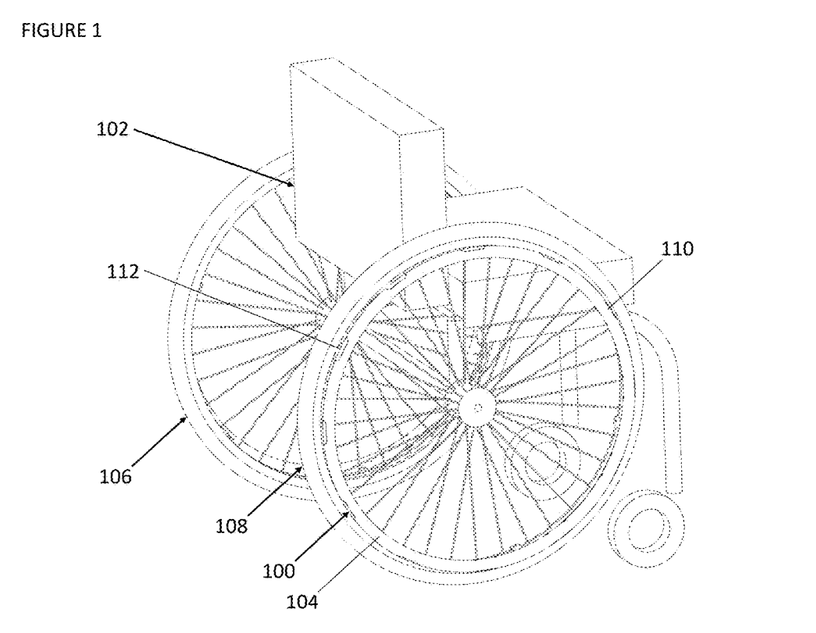
FIG. 1 is a side view of a wheelchair with a lighting system according to one embodiment of the invention.

FIG. 1 shows one embodiment of a wheelchair lighting system 100 of the invention. The wheelchair lighting system 100 is attached to a wheelchair 102. The wheelchair 102 includes a pushrim 104, a left wheel 106 and a right wheel 108. The wheelchair lighting system 100 includes a lighting apparatus 110 on the right wheel 106 and left wheel 108.

Figure 2:
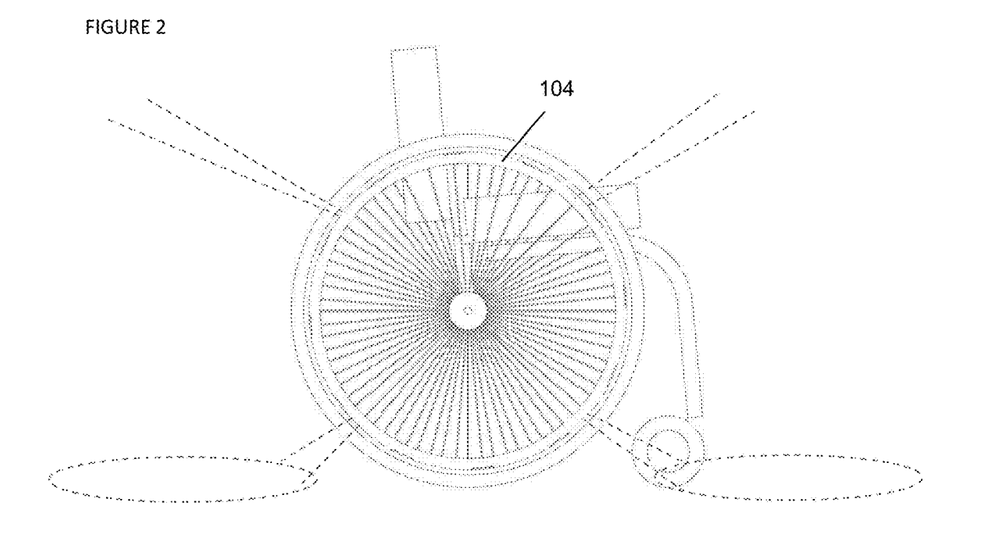
FIG. 2 is a side view of a wheelchair with a lighting system according to one embodiment of the invention.

The lighting apparatus 110 shown in FIG. 1 each include twelve lighting units 112. It will be appreciated that the lighting apparatus no may include any number of lighting units 112 more than twelve lights or fewer than twelve lights, and that the left wheel 106 and right wheel 108 may have a different number of lighting units 112 or the same number of lighting units 112. In one embodiment, the lighting units 112 are red, green, and blue (RGB) light emitting diode (LED) printed circuit board assemblies (PCBAs) and lens assemblies which have been inserted into holes located on the outer edge of the pushrim 104 and wired together internally. In one embodiment, the LED printed circuit board assemblies are all wired together with loose wires. In another embodiment, the LED printed circuit board assemblies are routed into a single long flexible printed circuit board assembly. It will be appreciated that any appropriate light source may be used, such as, for example, mechanoluminescent lights, and the like. These lighting units 112 preferably emit a red light or a white light, but can alternatively emit any appropriate wavelength of light. The LEDs preferably include a positive and negative terminal. In some embodiments, the lighting units 112 are equally spaced along the circumference of the left wheel 106 and the right wheel 108. The lighting units 112 are positions on the left wheel 10 and right wheel 106 to be able to project their light radially in front of, behind, and to the side of the left wheel 106 and right wheel 108. As shown in FIG. 2, in some embodiments, at any given time, only the lighting units 112 in the forward direction and the rear direction of the left wheel 106 and right wheel 108 are emitting light. It will be appreciated that the lighting apparatus 110 on the left wheel 106 and right wheel 108 may be comprised of identical hardware, but their lighting functions will be determined by a controller which will be described in further detail. A controller coupled to the lighting apparatus 110 control the "on/off" state of the lighting units 112 so that in one embodiment, the lights that are forward facing are on and the lights that are rear facing are on.

FIG. 2 depicts the wheelchair lighting system 110 in operation. As shown in FIG. 2, the wheelchair lighting system 110 directs light in front of and behind the left wheel 106 and right wheel 108. As shown in FIG. 2, the entire wheelchair lighting system 100 is visible from the front, back, and sides of the wheelchair. As shown in FIG. 2, the lighting apparatus 110 generates light that appears as continuous arcs of light to an observer. In one embodiment, the discrete lighting units 112 are spaced equally along the circumference of the pushrim 104 and are on the "on" state when the lights are facing forward or facing rearward. Locating the lighting units 112 in the pushrim 104 has several advantages. It will be appreciated that the nature of the pushrim 104 and embedded lighting units 112 being offset from the planes of the left wheel 106 and the plane of the right wheel 108 allows the light to better project in the forward, rearward and side directions. By offsetting the lighting units 112 from the left wheel 106 and right wheel 108, a reduced amount of light or no light is blocked by the wheel itself. This feature enhances the illumination capabilities of the wheelchair lighting system 100 as well as the visibility of the wheelchair 102 itself. The arcs of light generated by the lighting apparatus 110 have an angle of less than 120 degrees as shown in FIG. 2, but it will be appreciated that the arc angle may be greater than or less than 120 degrees.

Figure 3A:
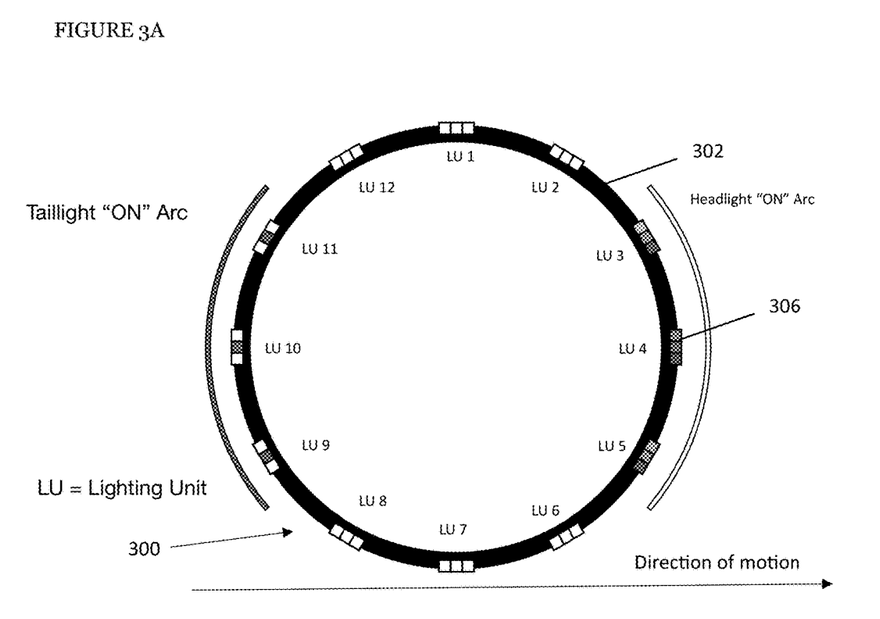
FIGS. 3A, 3B, and 3C are drawings illustrating the lighting system according to one embodiment of the invention.
Figure 3B:
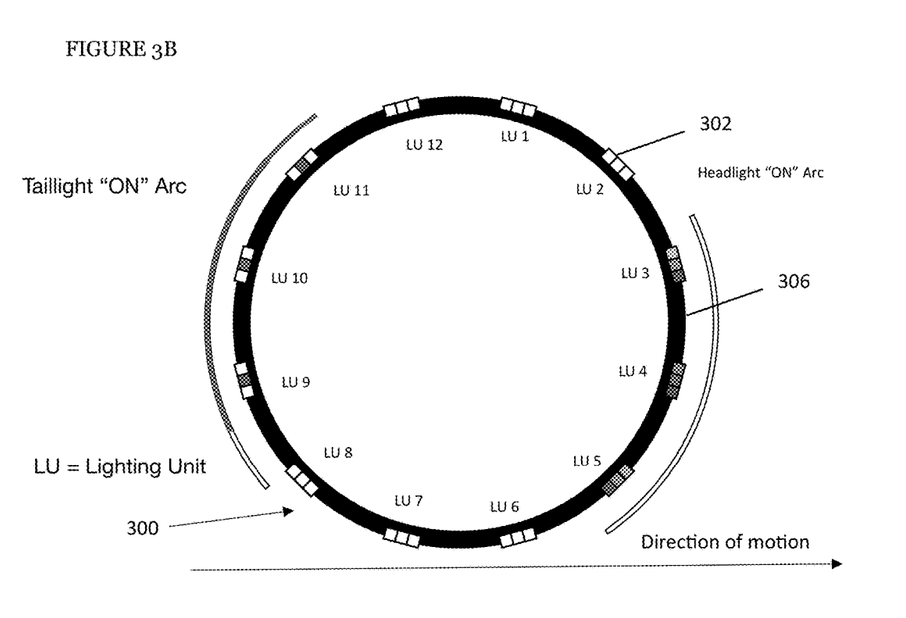
Figure 3C:
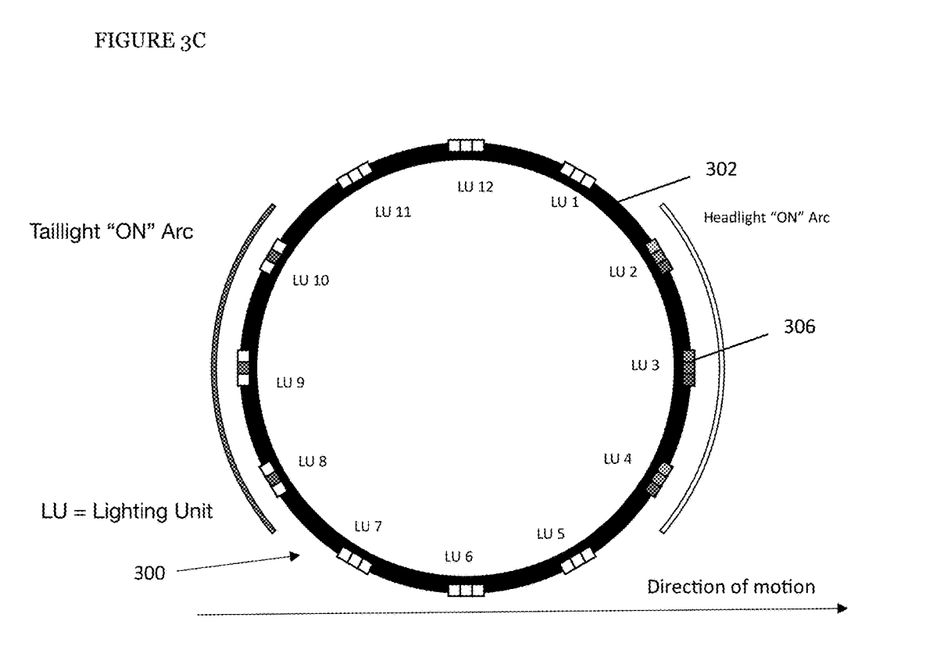

FIGS. 3A-3C are diagrams illustrating the operation of the wheelchair lighting system 300 in accordance with one embodiment of the invention. As shown in FIGS. 3A-3C, a pushrim 302 includes a collection of twelve lighting units 306 (lighting unit 1 through lighting unit 12). In this particular embodiment, a lighting unit 306 is comprised of three LEDs (red, green, and blue). The lighting units are preferably LEDs, but can alternatively be organic light emitting diodes, or any other suitable light source. These lighting units preferably emit a red, green or blue light, but can alternatively emit any appropriate wavelength of light. The LEDs preferably include a positive and negative terminal. It will be appreciated that although the pushrim 302 includes twelve lighting units 306 in FIGS. 3A-3C, the wheel may include more than or fewer than twelve lights. In this particular diagram illustrating the operation of the wheelchair lighting system 300, the direction of motion of the wheel is assumed to be from left to right. The light from the lighting apparatus appears as a continuous arc of light to an observer as show in FIG. 2.

As shown in FIG. 3A, a portion of the lighting units 306 that are located on the pushrim 302 are in the "on" state. In the forward portion of the pushrim 302 for this particular embodiment, the lighting units 306 are "on" and utilize the red, green, and blue LEDs to emit the appearance of white light. For this same embodiment, the lighting units 306 in the rearward portion of the pushrim 302 are "on" and utilize the red LEDs to emit red light. It will be appreciated that the number lighting units in the "on" state may be less than three adjacent lights or more than three adjacent lights. It will also be appreciated that the lighting units in the "on" state need not be adjacent to one another and may vary according to a particular event or as a function of time. These events may include user selection, braking, acceleration, hazard conditions, left and/or right turn signal, etc. It will be appreciated that a multitude of lighting patterns may be implemented that do not need to be in a continuously "on" or "off" state. For example, the light emitted by the lighting units may change color, blink, and vary in intensity to name a few. In this particular embodiment, when three lighting units 306 are in the on state and the pushrim 302 is in motion, an observer of the wheelchair and wheelchair lighting system 300 observes the light generated by the lighting units to be a continuous arc of light.

As shown in FIG. 3A, the pushrim 302 starts at an example reference position. Lighting unit 3, lighting unit 4, and lighting unit 5 are "on" and emitting the appearance of white light. Lighting unit 9, lighting unit 10, and lighting unit 11 are "on" and emitting red light. To an observer of the pushrim 302 and wheelchair lighting system 300, the light emitted from the lighting units appears as a continuous arc of light when the wheelchair is in motion. In this particular embodiment with a pushrim 302 containing twelve discrete lighting units 306, three adjacent lighting units 306 in the "on" state appears as an arc of light having approximately a 90-degree arc angle. It will be appreciated that the arc angle may be greater than or less than 90 degrees. Lighting unit 1, 2, 6, 7, 8, and 12 are in the "off" state. FIG. 3B is an illustration of the pushrim 302 at a subsequent time to that shown in FIG. 3A. The pushrim 302 has advanced in the direction of motion to a degree which enough to register a displacement from the original example reference position, but not enough to trigger any of the lighting units to change their "on/off" status. Lighting unit 1, 2, 6, 7, 8, and 12 are still in the "off" state. As shown in FIG. 3B, the lighting units 306 have rotated so as to register a displacement from the original example reference position and has directly contributed to visual illusion of a continuous arc of light as seen by an observer.

FIG. 3C is an illustration of the pushrim 302 at a subsequent time to that shown in both FIG. 3A and FIG. 3B. The pushrim 302 has advanced in the direction of motion to a degree which, in addition to registering displacement with respect to the original example reference position, is also enough to trigger a change in at least one of the lighting units 306. At the particular time shown in FIG. 3C, lighting unit 2, lighting unit 3, and lighting unit 4 are "on" and emitting the appearance of white light and lighting unit 8, lighting unit 9, and lighting unit 10 are "on" and emitting red light. The lighting units have rotated a sufficient amount as to change the "on/off" states of particular lighting units and thus have contributed to the visual illusion of an approximately stable and stationary continuous arc of light as seen by an observer. At the time depicted in FIG. 3C, lighting unit 1, 5, 6, 7, 11, and 12 are in the "off" state. The purpose of FIGS. 3A-3B is to break down the visual observation of a continuous arc of light as seen by an observe into its discrete component events, namely the "on/off" switching of lighting units at the appropriate time and pacing. When the wheelchair is moving, the combination of the discrete lighting units 306 being in the "on" state as shown in FIGS. 3A-3C appear as a continuous arc of light to an observer. The location of the arc appears to be fixed relative to the position of the wheelchair wheel and pushrim 302.

Figure 4:
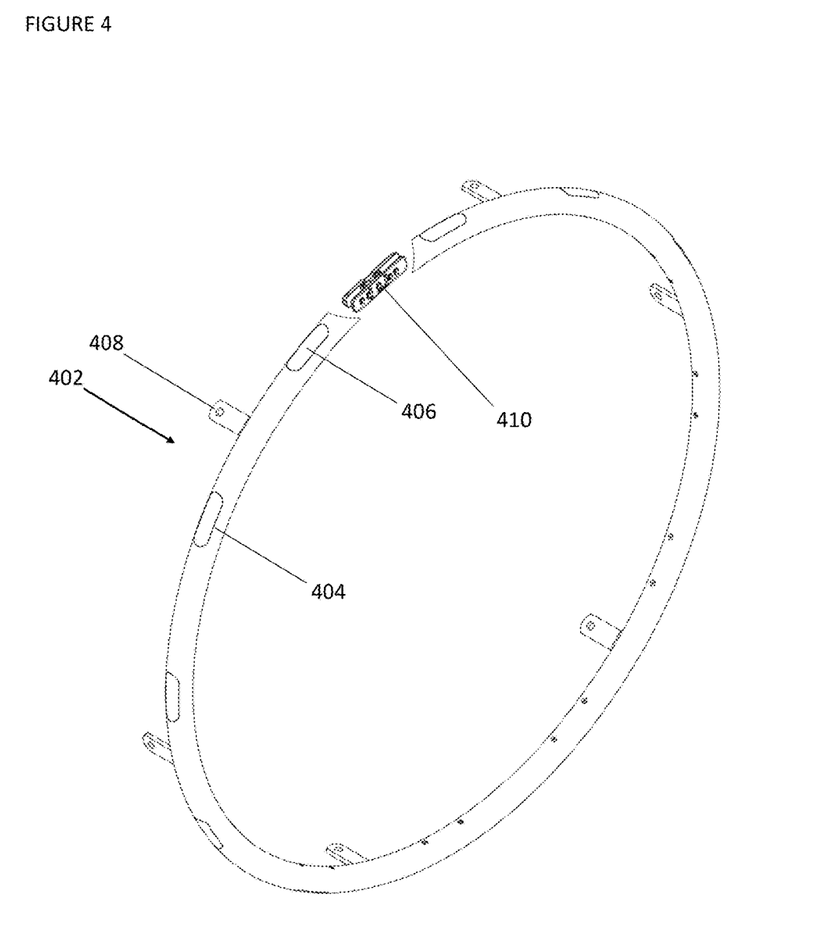
FIG. 4 is a detailed side view of the wheelchair lighting system according to one embodiment of the invention.

In some embodiments, the pushrim 402 contains twelve lighting units 404 including RGB LED printed circuit board assemblies and lens assemblies 406 which have been inserted into holes located on the outer edge of the pushrim 402 and wired together internally as shown in FIG. 4. This particular embodiment includes six mounting tabs 408 that affix the pushrim 408 onto a wheel of a wheelchair 102, but it will be appreciated that more than six or fewer than six mounting tabs 408 may be used to affix the pushrim 402 onto a wheelchair wheel. The mounting of the pushrim 402 to the wheelchair wheel, as determined by the particular setup of the mountain tabs 408, provides the offset of the lighting apparatus 110 with respect to the wheel itself. The benefit of this offset is that the light generated by lighting units 404 is not obstructed by the wheelchair 100 wheel to the extent that it may have been if the offset were nonexistent. It will be appreciated that the lighting apparatus 110 includes more than twelve lighting units 404 or fewer than twelve lighting units 404. The lighting units 404 are housed in an enveloped defined by the toroidal surface of the pushrim 402. In this particular embodiment, the surface of the lens assemblies 406 is flush with the exterior surface of the pushrim 402. A benefit of the lens assemblies 406 being flush with the exterior surface of the pushrim 402 is that it seamlessly integrates the design of the lighting unit 404 and lens assembly 406 with the natural contours of the pushrim 402. The lighting units 404 are wired together internally and connected to a main control printed circuit board assembly 410 as shown in FIG. 4. The control printed circuit board assembly 410 is a controller that is configured to control the "on/off" state of each of the lights in the lighting units 404 by controlling the voltage supplied to the lighting units 404. In some embodiments, the control printed circuit board assembly 410 controls the "on/off" state of the lights in the lighting units 404 in accordance with the methods described in the method section of the detailed description.

Figure 5:
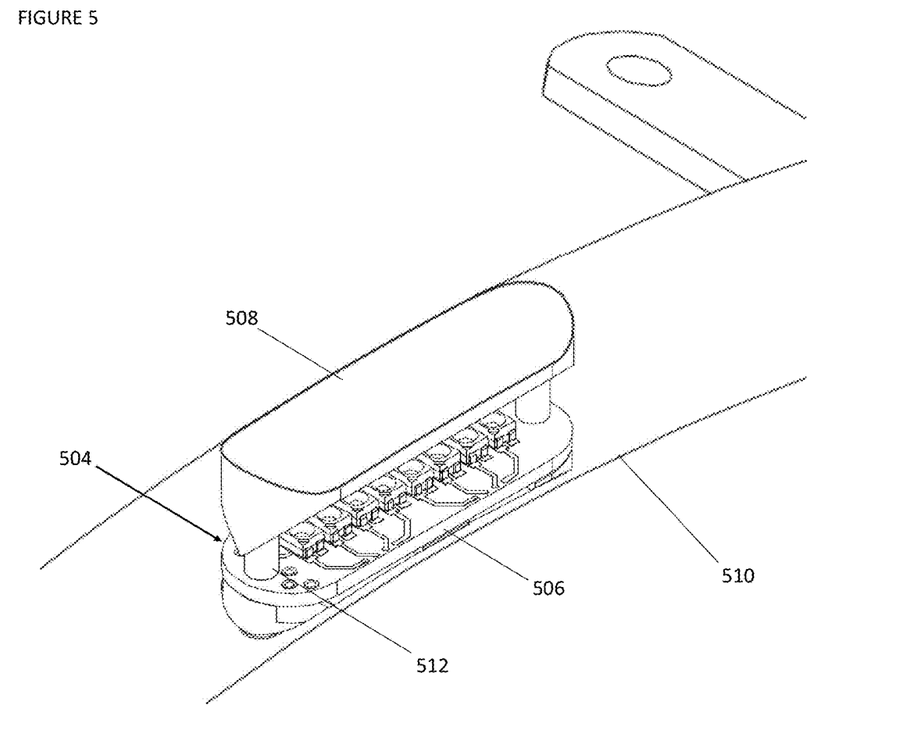
FIG. 5 is a detailed view of a lighting unit of FIG. 4 the wheelchair lighting system according to one embodiment of the invention.

FIG. 5 is a detailed view of a lighting unit 504 including a RGB LEDs (red, green, and blue light emitting diodes) printed circuit board assemblies 506 and lens 508 showing the major components exposed and one particular organization of these components. It will be appreciated that this embodiment includes eight RGB LEDs for the purposes of achieving a spectrum of color available to that captured by some distribution of eight red, green, and blue LEDs. It will be appreciated that more than eight or fewer than eight LEDs in this particular embodiment can be used to achieve a desired spectrum of color. This particular embodiment uses the combination of a light emitting source and a focusing lens 508 to direct light in the orientation radially outward from the pushrim 510. The lens also directs a sufficient amount of lighting to the side of the pushrim 510 that can be used to increase the visibility of the wheelchair 102. It will be appreciated that directing the light in a particular orientation may be achieved through a component other than a lens. The lens 508 is held in place through an attachment mechanism, which, in this particular embodiment, is a pair of attachment screws 512. Other embodiments may prefer to use alternative attachment mechanism, including, but not limited to adhesives, bolts, clamps, etc. In this particular embodiment, a signal connection is used to communicate an "on/off" signal between the lights and the control printed circuit board assembly 410 as shown in FIG. 4.

Figure 6:
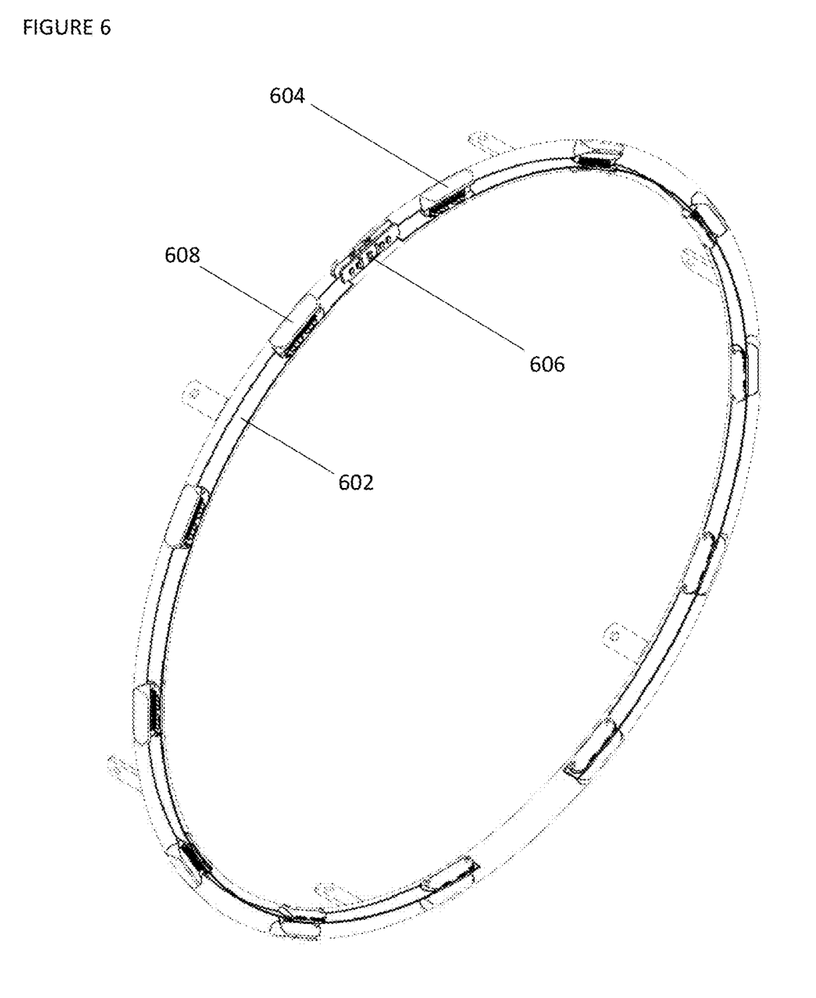
FIG. 6 is a detailed side view of the wheelchair lighting system according to one embodiment of the invention.

In some embodiments, the design could include one long, flexible printed circuit board 602 on which all the lens assemblies 604 and control component printed circuit board assembly 606 are attached as shown in FIG. 6. The control printed circuit board assembly 606 is attached to the flexible printed circuit board 602 and controls the individual lighting units 608. The benefit of this particular embodiment is that part count would be reduced. A reduction of part count has the potential benefit of decreasing assembly time. It will be appreciated that the printed circuit board 602 does not necessarily need to be one long piece and may be more than one long piece. It will also be appreciated that any appropriate light source may be used, such as, for example, electroluminescent lights.

Figure 7:
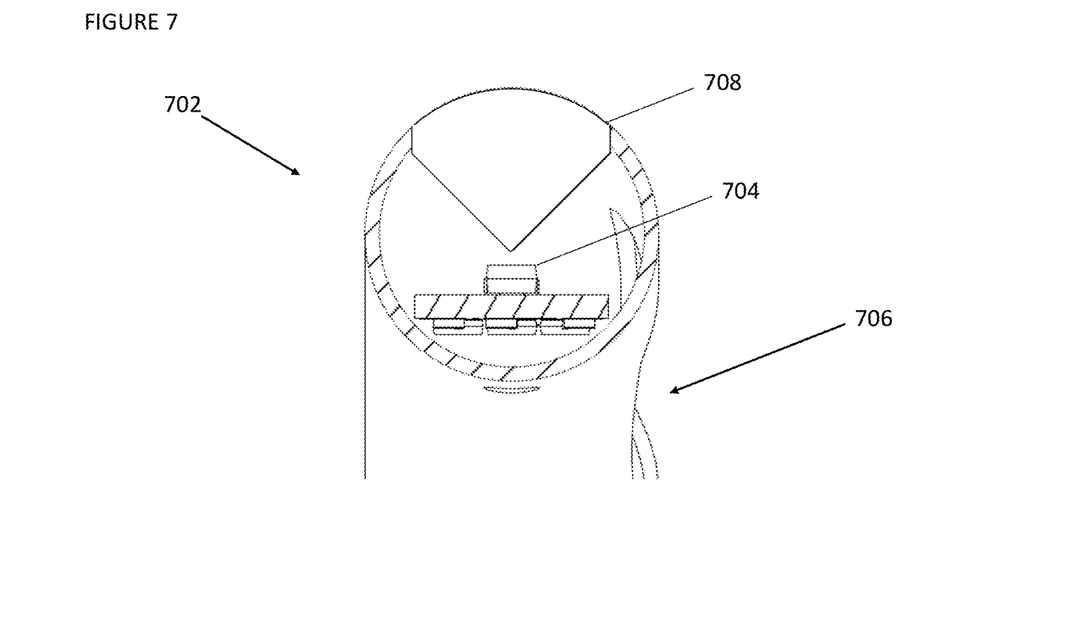
FIG. 7 is a detailed view of a lighting unit of FIG. 6 of the wheelchair lighting system according to one embodiment of the invention.

A cross-sectional view of a lighting unit 702 is shown in FIG. 7. As shown in this particular embodiment, light emitting from the LEDs 704 is collected and redirected in a radially outward orientation with respect to the pushrim 706. As a consequence of most surface mounting LEDs emitting a wide projection of light, the lens 708 is necessary to coalesce and direct the light coming from the LEDs 704. In this particular embodiment, the lens 708 interacts with the wheelchair user's hand. This scenario creates a constraint that the pushrim 706 should be smooth enough so as to not generate an unnecessary amount of friction or irritation between it and the wheelchair user's hands. It may be appreciated that this lens assembly has the potential to be manufactured to create a flush outer pushrim surface. There are a number of benefits of a flush outer pushrim surface including reducing user perceptibility that the pushrim includes internal components and integrating the design of the lighting unit 702 with the natural contours of the pushrim.

Figure 8:
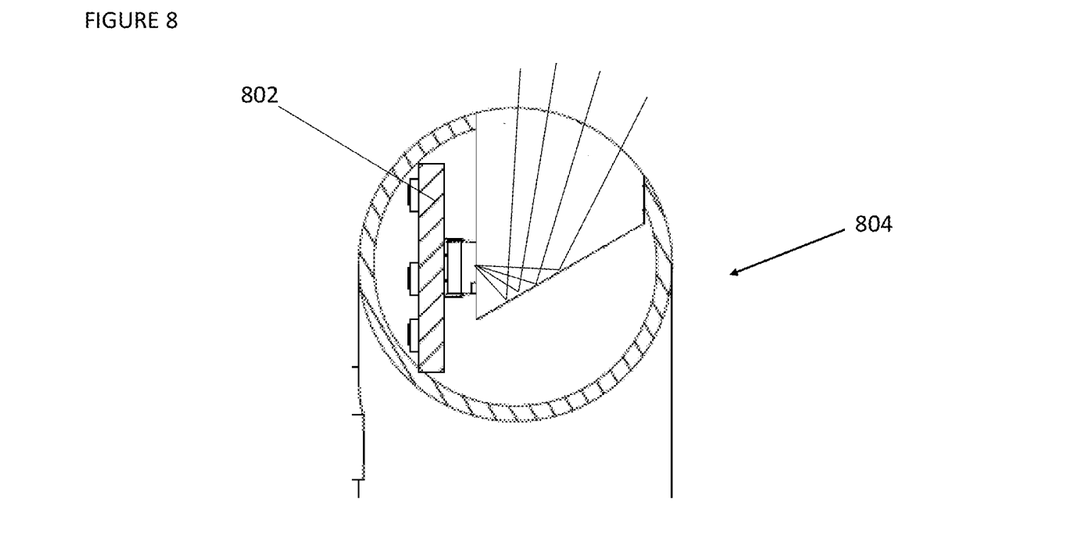
FIG. 8 is a detailed view of a lighting unit of the wheelchair lighting system according to one embodiment of the invention.

In some embodiments, the RGB LED printed circuit board assembly 802 is mounted parallel to the plane that cuts through the circumference of the pushrim 804 as shown in FIG. 8. It will be appreciated that this particular embodiment allows the lens to be shifted off center towards the outside of the rim to increase the side visibility of the observer of the wheelchair 100. This particular embodiment is amenable to use of a different type of internal reflection lens designed to increase radial lighting projection. As shown in this particular embodiment, light emitting from the LEDs is collected and redirected in a radially outward orientation with respect to the pushrim 804. It will be appreciated the printed circuit board assembly 802 need not necessarily be mounted strictly parallel to the plan that cuts through the circumference of the pushrim 804. A consequence of this particular embodiment is that some of the light that is generated is in the direction of a normal vector to the plane of the printed circuit board.

Figure 9:
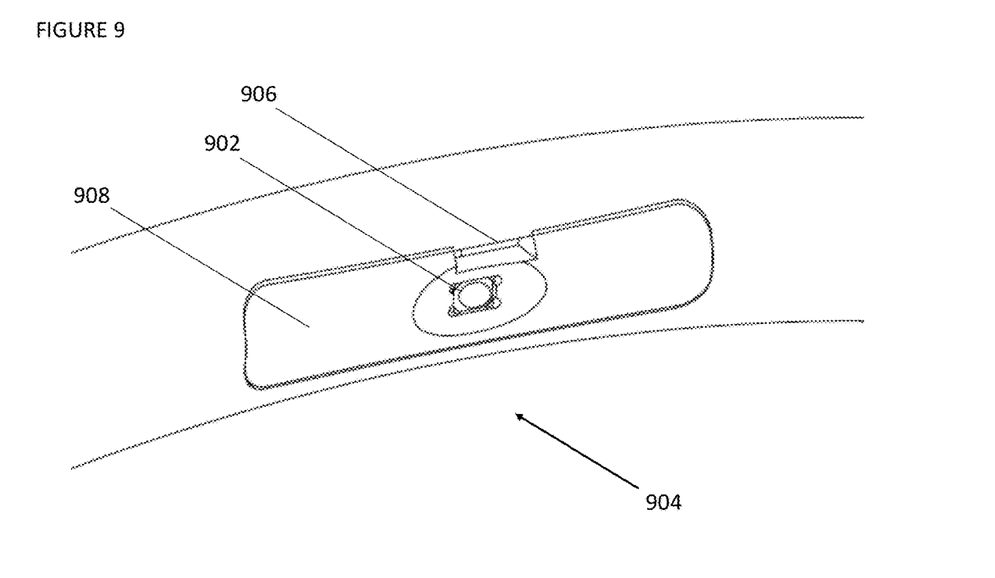
FIG. 9 is a detailed view of a button of the wheelchair lighting system according to one embodiment of the invention.

In some embodiments, controlling the function of lights is achieved through a single tactile button 902 located on the exterior surface of the pushrim 904 as shown in FIG. 9. It will be appreciated that user control of the lighting function can be achieved in a multitude of ways, including, but not limited to, multiple buttons, knobs and capacitive sense buttons. This particular embodiment of a button 902 is elaborated upon for illustrative purposes. As shown in FIG. 9, the button 902 used to control the function of lights is located as to be quick and easy to find for a wheelchair user. It will be appreciated that the shape of the button 902 can allow the user to find it easily in dark situations. In this particular embodiment, the button 902 is located on the control printed circuit board assembly 906, which is covered by a controller cover 908. It will be appreciated that the controller cover 908, although shown as one piece, does not necessarily have to be one piece, nor does it have to cover the entire control printed circuit board.

Figure 10:
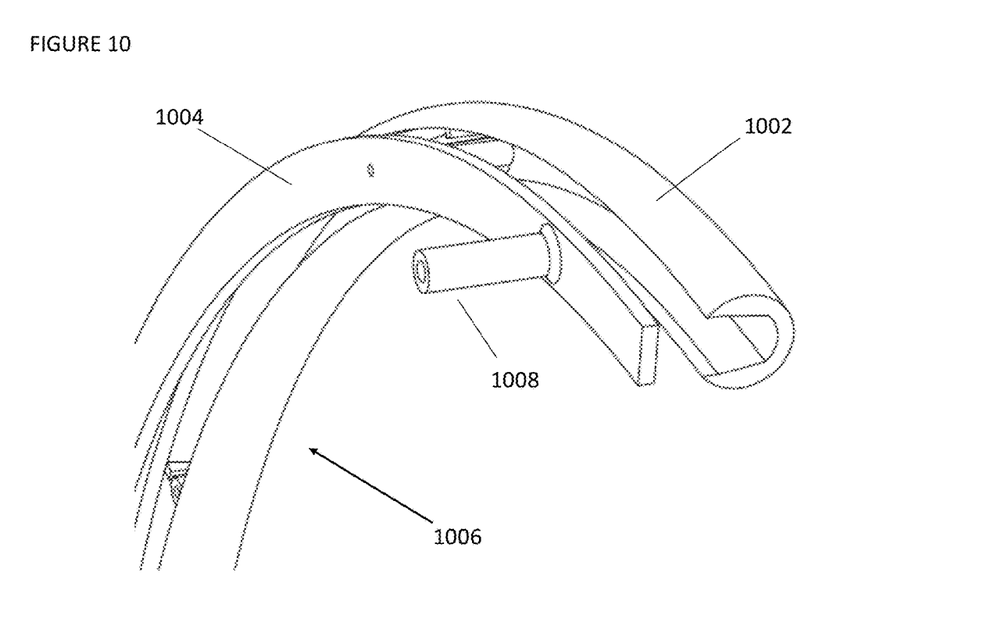
FIG. 10 is a detailed view of the wheelchair lighting system according to one embodiment of the invention.

A sectioned and exploded view of one embodiment is shown in FIG. 10. In this particular embodiment, there are two main parts: the housing 1002 and the reinforcing spine 1004. It will be appreciated that the housing 1002 can be injection molded in one piece and doubles as protection for the electronic components as well as a type of lens for any internal LEDs. In this particular embodiment, the housing 1002 is clear so that light can pass through it to create illumination and visibility. It will be appreciated that the housing 1002 can exist in a variety of shapes, including but not limited to having a consistent cross-sectional area or regularly spaced lens shapes that correspond to a lighting unit. In this particular embodiment, the reinforcing spine 1004 is a metal frame that is adapted to attach to the wheelchair wheel. It will be appreciated that the reinforcing spine 1004 may be composed of a material that is a non-metal, but that the function of the spine is to provide structural support to the pushrim 1006. In this particular embodiment, the reinforcing spine 1004 includes an example of a mounting tab 1008 that can be used to attach the entire pushrim 1006 to the wheelchair 102. It will be appreciated that the mounting tab 1008 can take on a variety of different forms, including, but not limited to, the depicted example.

Figure 11:
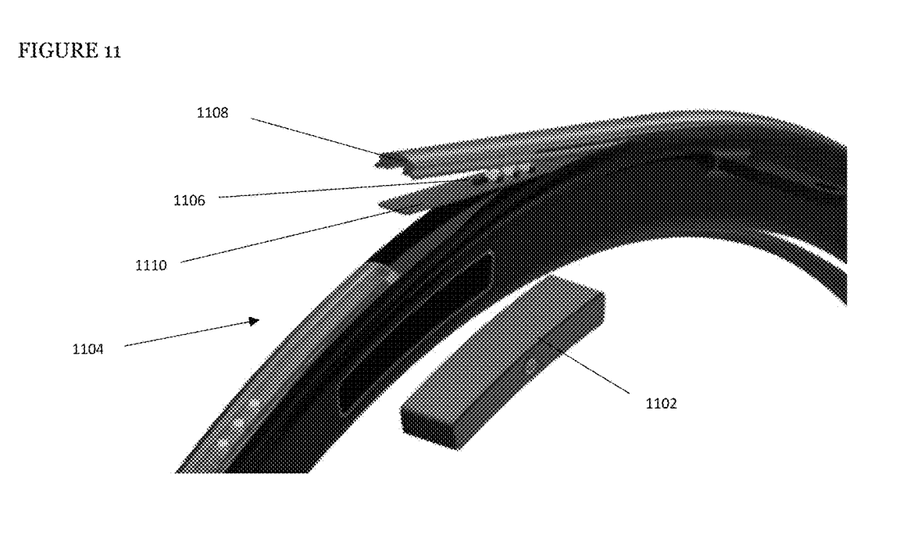
FIG. 11 is a detailed view of battery of the wheelchair lighting system according to one embodiment of the invention.

In some embodiments, a battery 1102 is inserted into the pushrim 1104 as shown in FIG. 11. Mounting the battery 1102 in the pushrim 1104 has several advantages. In one embodiment, the battery 1102 is removable and can blend in with the overall structure of the pushrim 1104. The advantage of this aspect of the embodiment is that the battery 1102 is hidden from an outside observer's view. In one embodiment, the battery 1102 is rechargeable. It will be appreciated that the battery 1102 can be removed and recharged in a separate location, but that this is not the only way to integrate a battery 1102 into this system. It is preferable for the battery 1102 to be rechargeable so as to reduce costs associated with obtaining new batteries and disposing of used ones. The batteries can be lithium ion batteries, lithium polymer batteries, nickel cadmium batteries, or any other appropriate battery chemistry. It will be appreciated that the power source for the lighting unit need not necessarily be a battery and can be any appropriate source of electricity. The lighting units 1106 shown in FIG. 11 are comprised of light emitting diodes (LEDs). It will be appreciated that a variety of other light sources may be used. In one embodiment, the lens 1108 is made of a soft material conducive to being gripped by the hand, and, in one embodiment, the printed circuit board assembly 1110 is a thin and flexible strip. In this particular embodiment, the lens 1108 is smooth enough so as to not generate an unnecessary amount of friction or irritation between it and the wheelchair user's hands. It may be appreciated that this lens has the potential to manufactured as one continuous smooth strip, thereby integrating the lens 1108 with the natural contours of the pushrim 1104. In this particular embodiment, the lens 1108 preferably acts as a cover for the internal components including, but not limited to, the LEDs and printed circuit board assemblies 1110.

Figure 12:
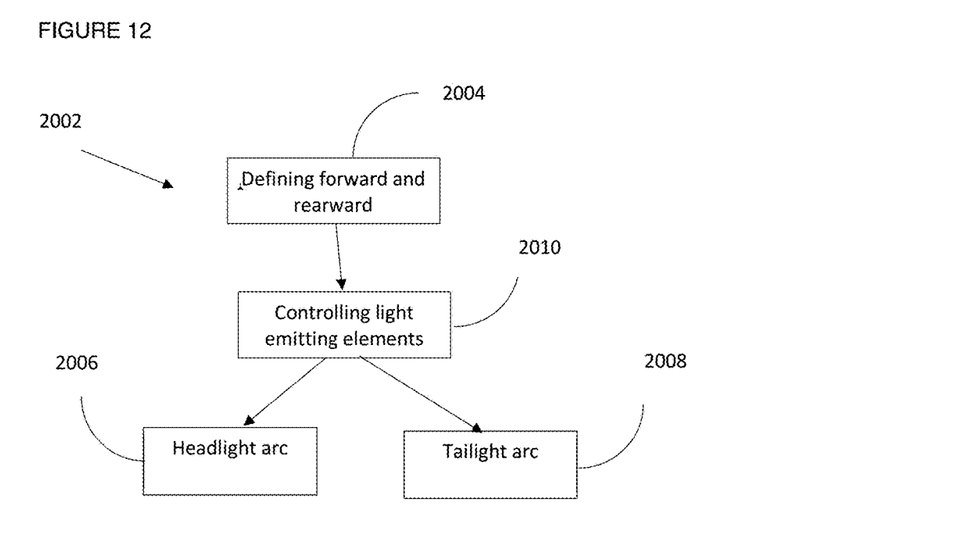
FIG. 12 is a flow diagram illustrating the control of the lighting system according to one embodiment of the invention.

A flow diagram illustrating a method of operating a plurality of light emitting elements for a wheel in accordance with one embodiment of the invention is shown in FIG. 12. It will be appreciated that the method 2002 may vary from that shown in FIG. 12, including additional or fewer steps and in a different order. In one particular embodiment, the method 2002 is implemented as a computer readable medium (software) that is executed by a controller that is part of the wheelchair lighting system 100. In one embodiment, the method 2002 is written as C++ code. It will be appreciated that the method 2002 may be implemented in other computer readable media formats known to persons of ordinary skill in the art.

In some embodiments, the method 2002 defines a forward and rear orientation 2004 with respect to a reference point as shown in FIG. 12. The control algorithm uses the information regarding the orientation to control light emitting elements 2010 and direct light radially outward from the wheel in the forward orientation to form a headlight arc of light 2006 and in the rear orientation to form a taillight arc of light 2008. The light emitting elements are controlled whereby each of the lights toggles between a lit state emitting light at full power and a dim state emitting light at less than full power. It will be appreciated that the "on" states of the lights need not be synchronized and controlled, but that a preferred embodiment has the lights controlled by the control printed circuit board assemblies 410.

Figure 13:
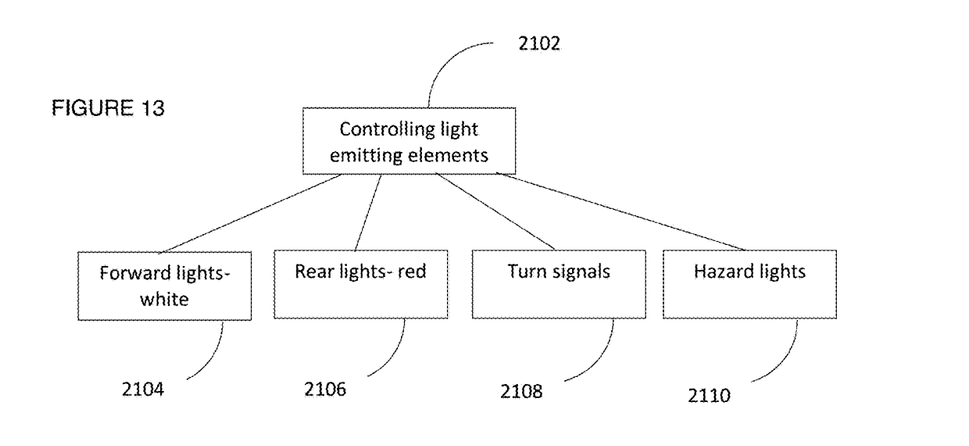
FIG. 13 is a diagram illustrating examples of the illumination patterns of the lighting system according to one embodiment of the invention.

In some embodiments, a particular lighting pattern is achieved through the control printed circuit board assembly 410. Controlling the light emitting elements 2102 is part of the method that is illustrated in FIG. 13. The light emitting elements directing light in the forward orientation emit the visual appearance of white light 2104 in the lit state. In another embodiment, the light emitting elements directing light in the rear orientation emit the appearance of red light 2106 in the light state. These two embodiments are the preferred lighting patterns that are widely accepted as standard for roadway signaling. This adaptation to wheelchairs offers the users of wheelchairs an opportunity to be visible to road traffic in a way that is intuitive and conforms to widely accepted practice.

The state of the lights corresponds to an illumination pattern that is visible to an observer. Herein, illumination pattern refers to the particular combination of lights that are in the "on/off" state, where "on" can range from being fully "on" or being only partially "on". For example, an illumination pattern may be that each light is turned on at 70 degrees of rotation and turned off at 90 degrees of rotation with respect to a reference position. In another example, an illumination pattern may be that each light is turned on at 60 degrees of rotation and turned off at 100 degrees of rotation with respect to a reference position. In another embodiment, the illumination pattern when the wheelchair is moving may differ from the illumination pattern when the wheelchair is stationary. The illumination pattern when the wheelchair is accelerating or decelerating may differ from the illumination pattern when the wheelchair is stationary.

Alternatively, the illumination pattern when the wheelchair is going at constant velocity may differ from the illumination pattern in the aforementioned scenarios. The illumination pattern may be continuous and consistent. For example, the illumination pattern may appear as continuous arcs of lights when the wheelchair is moving at a constant velocity, decelerating, or accelerating. The illumination pattern in some embodiments may differ according to whether the wheelchair user is making a right turn or left turn, captured by a mode consistent with turn signals 2108 as shown in FIG. 13. This is not unlike the signaling system used when a vehicle is preparing to make a right turn or a left turn corresponding to a right-hand turn signal and a left-hand turn signal. In these embodiments, the lighting system may include detecting capabilities to determine the directionality of the vehicle in motion and thus automatically initiating the turn signal function. In some embodiments, the illumination pattern may flash in a consistent, timed manner to signify a warning embodied by hazard lights 2110 as shown in FIG. 13 to oncoming vehicles and other passersby. This is not unlike the hazard lights for a road vehicle signaling heightened attention and awareness of the vehicle displaying the hazard lights. In these embodiments, the lighting system may include a control button that initiates the hazard lighting illumination pattern.

The benefit of using a lighting unit 404 comprised of individual red, green, and blue LEDs is that a wide selection of colors can be achieved through combinations of the individual red, green, and blue LEDs. In some embodiments, the brightness of the LEDs can be modulated to achieve a high-beam or low-beam mode, corresponding to the lighting units emitting light at full power and the lighting units emitting light at less than full power. The wide selection of colors allows the wheelchair lighting system 100 to serve a variety of purposed as demonstrated by the examples given in the aforementioned text, including, but not limited to directing white the forward direction 2104, directing red light in the rear direction 2106, implementing turn signals 2108, and implementing hazard lights 2110.

In some embodiments, the operation of a plurality of light emitting elements as depicted in FIG. 12 is a part of a toroidal ring configured to mount to a wheelchair. One example of a toroidal ring designed to mount to a wheelchair 102 is a pushrim 104, but the structure is generally expected to provide enough structural integrity for a wheelchair user to propel the wheels of the wheelchair 102 in a desired direction. It will be appreciated that the toroidal ring does not necessarily have to be originally designed to be a part of the wheelchair apparatus and can be extensively modified in order to fit the requirements as set forth through the design constraints. A preferred embodiment has the light emitting elements approximately evenly dispersed about the ring. It will be appreciated the light emitting elements can be randomly dispersed about the ring or located somewhere outside of the ring. The light emitting element are preferably LEDs, but can alternatively be incandescent bulbs, or any other suitable light source. These light emitting elements preferably emit a red light or a white light, but can alternatively emit any appropriate wavelength of light. The LEDs preferably include a positive and negative terminal. In one embodiment, the LED printed circuit board assemblies are routed into a single long flexible printed circuit board assembly, while in another embodiment, the LED printed circuit board assemblies are all wired together with loose wires.

Data is collected associated with relative metrics of the wheelchair position, velocity, acceleration, etc. and can be used to determine the "on/off" and "high/low" states of the lighting unit lights. In one embodiment, the velocity of data of the wheel is generated by an accelerometer. It will be appreciated that controlling the light emitting elements requires receiving data about the velocity of the wheel. The velocity data of the wheel can be used to generate a light pattern.

A person skilled in the art will recognize that modifications and changes can be made to the preferred embodiments of the invention without departing from the scope of this invention defined in the following claims.

What is claimed is:

1. A lighting system for a wheelchair wheel comprising:
   a plurality of light emitting elements;
   a toroidal rim configured to accommodate the light emitting elements and mount to a wheelchair, the rim laterally offset along a perpendicular vector from a plane defined by two radius vectors of the wheel;
   a controller coupled to the light emitting elements allowing the lights to toggle between a lit state emitting light at full power and a dim state emitting light at less than full power.

2. The lighting system of claim 1, wherein the light emitting elements are approximately evenly dispersed about the rim.

3. The lighting system of claim 1, wherein the plurality of light emitting elements are configured to project light radially outward.

4. The lighting system of claim 3, wherein an arc angle of light generated by the light emitting elements is less than 120 degrees.

5. The lighting system of claim 1, wherein the plurality of light emitting elements are light emitting diodes.

6. The lighting system of claim 1, further comprising a power source electrically connected to the light emitting elements.

7. The lighting system of claim 6, wherein the power source is mounted on a hub of the wheel.

8. The lighting system of claim 6, wherein the power source is mounted on a frame of a structure supporting the wheel.

9. The lighting system of claim 6, wherein the power source is a battery.

10. The lighting system of claim 1, wherein an exterior surface of the rim comprises a soft material.

11. The lighting system of claim 1, further comprising an accelerometer, and wherein the controller is configured to receive data from the accelerometer to ascertain a velocity of the wheel.

12. A method for operating a plurality of light emitting elements for a wheel comprising:
    defining forward and backward orientation with respect to a reference point;
    controlling the light emitting elements whereby each of the lights toggles between a lit state emitting light at full power and a dim state emitting light at less than full power;
    directing light radially outward from the wheel in the forward orientation to form a headlight arc of light and in the rear orientation to form a taillight arc of light.

13. The method of claim 1, wherein the light emitting elements directing light in the forward orientation emit white light in the lit state, and wherein the light emitting elements directing light in the rear orientation emit red light in the lit state.

14. The method of claim 12, further comprising a toroidal ring configured to mount to a wheelchair wherein the light emitting elements are approximately evenly dispersed about the ring.

15. The method of claim 12, wherein an arc angle measure of the headlight and tail light arc each is 120 degrees or less.

16. The method of claim 12, wherein controlling the light emitting elements requires the receiving data about a velocity of the wheel.

17. The method of claim 16, wherein the velocity data of the wheel is generated by an accelerometer.

18. The method of claim 16, wherein the velocity data of the wheel is used to generate a light pattern.

* * * * *